(12) United States Patent
Lehmann et al.

(10) Patent No.: US 6,354,003 B1
(45) Date of Patent: Mar. 12, 2002

(54) PROCESS AND ARRANGEMENT FOR PRODUCING AN ELONGATED CLOSED DUCT WITHIN A HOLLOW SPACE OF THE VEHICLE BODY

(75) Inventors: Klaus-Peter Lehmann, deceased, late of Mühlacker, by Bernadette Lehmann, heiress; Hermann Reichling, Köln; Gert Rogner, Ettlingen, all of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/592,676

(22) Filed: Jun. 12, 2000

(30) Foreign Application Priority Data

Jun. 12, 1999 (DE) .......................................... 199 26 861

(51) Int. Cl.⁷ .............................................. B21D 53/88
(52) U.S. Cl. ....................... 29/897.2; 29/460; 29/527.2; 29/525.01; 296/208
(58) Field of Search .............................. 29/897.2, 421.1, 29/460, 525.01, 527.1, 527.2; 72/54, 58, 61; 427/424, 373, 384, 385.5, 388.1; 180/68.1; 296/180.1, 208

(56) References Cited

U.S. PATENT DOCUMENTS

| 4,908,231 A | * | 3/1990 | Nelson et al. | ............... 427/379 |
| 5,252,364 A | * | 10/1993 | Inoue et al. | ................ 427/409 |
| 5,529,743 A | * | 6/1996 | Powell | ........................ 264/513 |
| 5,642,914 A | | 7/1997 | Takabatake | ................. 296/187 |
| 6,200,650 B1 | * | 3/2001 | Emch | .......................... 427/542 |

FOREIGN PATENT DOCUMENTS

| DE | 26 20 029 | 11/1977 |
| DE | 84 27 918 | 12/1984 |
| DE | 41 39 329 | 6/1992 |
| DE | 197 05 864 | 8/1998 |

* cited by examiner

Primary Examiner—David P. Bryant
Assistant Examiner—Jermie E. Cozart
(74) Attorney, Agent, or Firm—Crowell & Moring LLP

(57) ABSTRACT

In the case of a process for producing an elongated closed duct within a hollow space of a vehicle body, it is provided that the guiding element formed of plastic is equipped on both ends with exterior surrounding flanges. Between the flanges and the vehicle body parts, one surrounding foam seal respectively is arranged which swells up during the painting process in the drying oven at a defined temperature and forms a tight connection between the vehicle body parts and the guiding element.

14 Claims, 7 Drawing Sheets

PROCESS AND ARRANGEMENT FOR PRODUCING AN ELONGATED CLOSED DUCT WITHIN A HOLLOW SPACE OF THE VEHICLE BODY

BACKGROUND AND SUMMARY OF THE INVENTION

This application claims the priority of German Patent Document No. 199 26 861.4, filed Jun. 12, 1999, the disclosure of which is expressly incorporated by reference herein.

The invention relates to a process for producing an elongated closed duct within a hollow space of a vehicle body and to an arrangement for implementing this process. Preferred embodiment invoke closed ducts in the form of the tube-shaped guiding elements made of plastic.

From German Patent Document DE 84 27 918 U1, an elongated closed duct is known within a hollow space of the vehicle body, the hollow space of the vehicle body being composed of at least two vehicle body parts and the duct being formed by a tube-shaped closed guiding element made of plastic.

In the case of this arrangement, the body shell with the hollow space of the vehicle body is produced first; then the body shell passes through the complete painting process; and subsequently, the elongated tube-shaped guiding element is inserted from the rearward open end area of the hollow space of the vehicle body and is connected on both ends with adjoining components. The forward end of the tube-shaped guiding element is fitted onto a vehicle-body-fixed connection piece of a vehicle body part and is connected by additional connection devices with the connection piece.

It is an object of the invention to form an elongated closed duct within a hollow space of the vehicle body, which duct is formed by a tube-shaped guiding element made of plastic, in which case the end areas of the guiding element can be sealingly connected without additional connection devices in a simple manner to adjoining vehicle body parts.

According to the invention, this object is achieved by utilizing a process for producing an elongated closed duct within a hollow space of a vehicle body, the hollow space of the vehicle body being composed of at least two vehicle body parts, and the duct being formed by a tube-shaped guiding element made of plastic, said process comprising:
providing both ends of the guiding element with exterior surrounding flanges, arranging respective surrounding foam seals between the flanges and the vehicle body parts, said foam seals being formed of material which swells up during heating in a predetermined temperature range and,
conducting a painting process including drying in a drying oven at the predetermined temperature range to thereby cause swelling of the foam seals to form a tight connection between the vehicle body parts and the closed duct guiding element.

Principal advantages achieved by means of the invention are that, as the result of the swelling-up of the foam seals provided at the end side on the guiding element during the painting process of the vehicle body, a tight connection is ensured of the duct with the surrounding air space within the hollow space of the vehicle body, and that no additional connection devices are required between the ends of the tubeshaped guiding element and the adjoining vehicle body parts.

A duct which is partitioned off in such a manner can be used for feeding air to a cooler situated behind it, as a cable duct or for carrying a liquid medium. Locally molded-on lugs on the guiding element can be fastened in a simple manner by means of a screwed connection to adjacent vehicle body parts, whereby the guiding element is correctly positioned. As the result of the tight partitioning-off of the duct, the air space surrounding the guiding element inside the hollow space of the vehicle body can be used, for example, for the air removal ventilation of the interior of the vehicle occupant compartment.

Other objects, advantages and novel features of the present invention will become apparent from the following detailed description of the invention when considered in conjunction with the accompanying drawings.

DETAILED DESCRIPTION OF THE DRAWINGS

Figure 1:
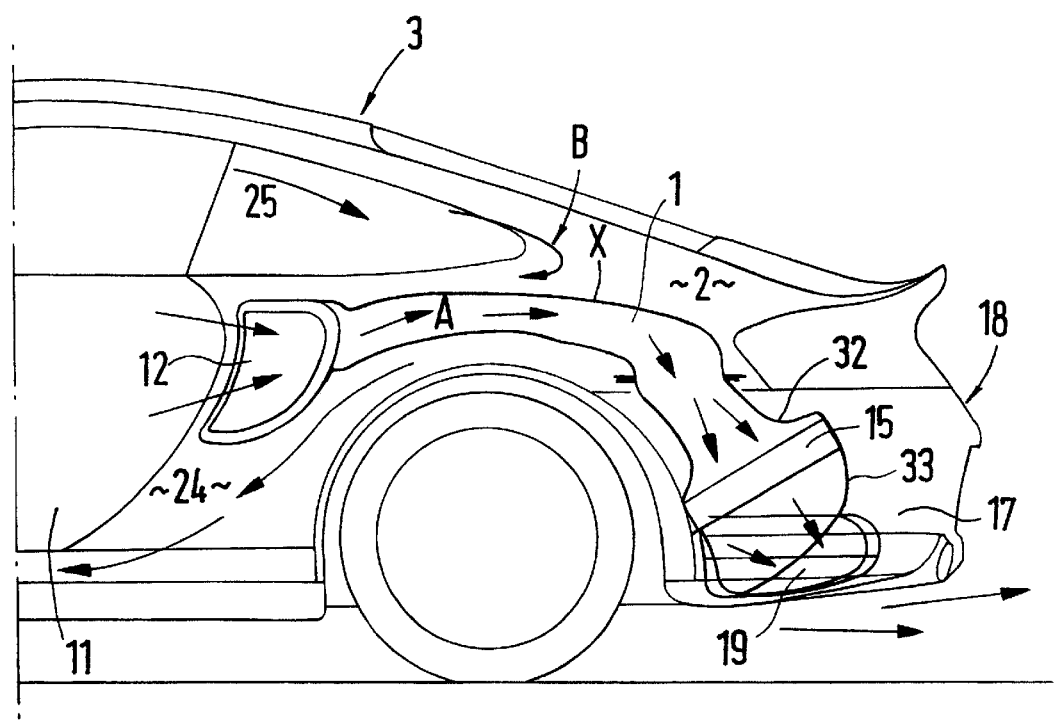
FIG. 1 is a partial lateral view of a motor vehicle having an elongated closed duct inside a hollow space of a vehicle body, constructed according to a preferred embodiment of the invention.
Figure 2:
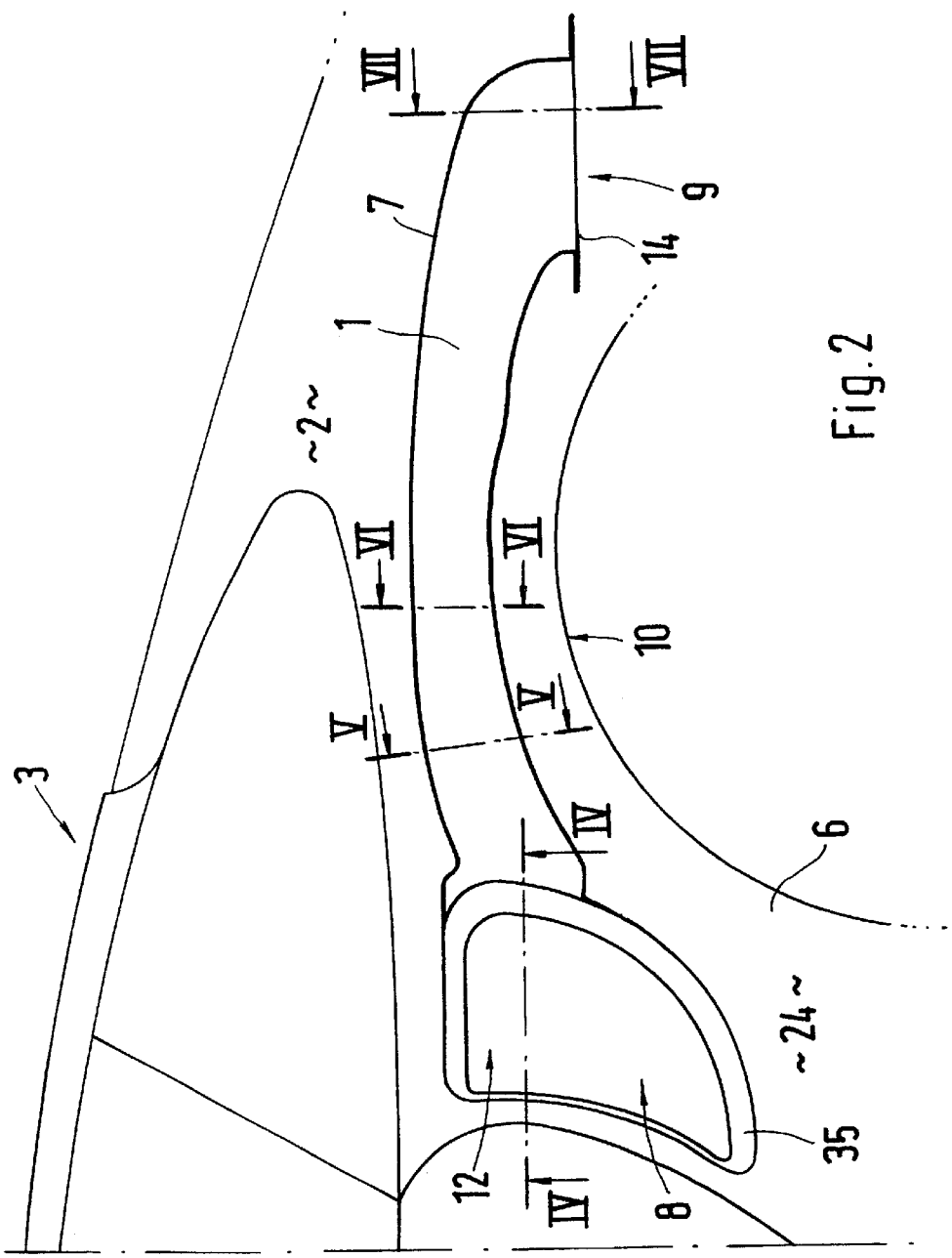
FIG. 2 is an enlarged view of a detail X of FIG. 1.

FIG. 1 illustrates an elongated closed duct 1 inside a hollow space 2 of the body of a vehicle 3, the hollow space 2 of the vehicle body being composed of at least two vehicle body parts 4, 5, 6. The duct 1 is formed by an elongated tube-shaped guiding element 7 which has an open construction only at its two ends 8, 9. The tube-shaped guiding element 7 is formed by a blown part or an injection-molded part made of a suitable plastic material (such as a glass-fiber-reinforced polyamide), the plastic material being thermally stable at least up to approximately 2000C.

In the illustrated embodiment, the hollow space 2 of the vehicle body extends above a rearward-side wheel house 10 and is composed of an upper wheel house wall 4, an inner side part 5 and a rearward side part 6 forming a vehicle body shell part. Adjacent to the rearward edge of a side door 11 disposed in front of it, a first opening 12 of the duct 1 is provided on the upright rearward side part, which opening 12, in the lateral view, has an approximately crescent-shaped construction. A second opening 14 of the duct 1 is provided on a wall section 13 of the upper wheel house wall 4, which wall section 13 extends approximately horizontally or in a slightly inclined manner. However, the hollow space 2 of the vehicle body can also be formed by an exterior side member, a transmission tunnel or the like.

Figure 3:
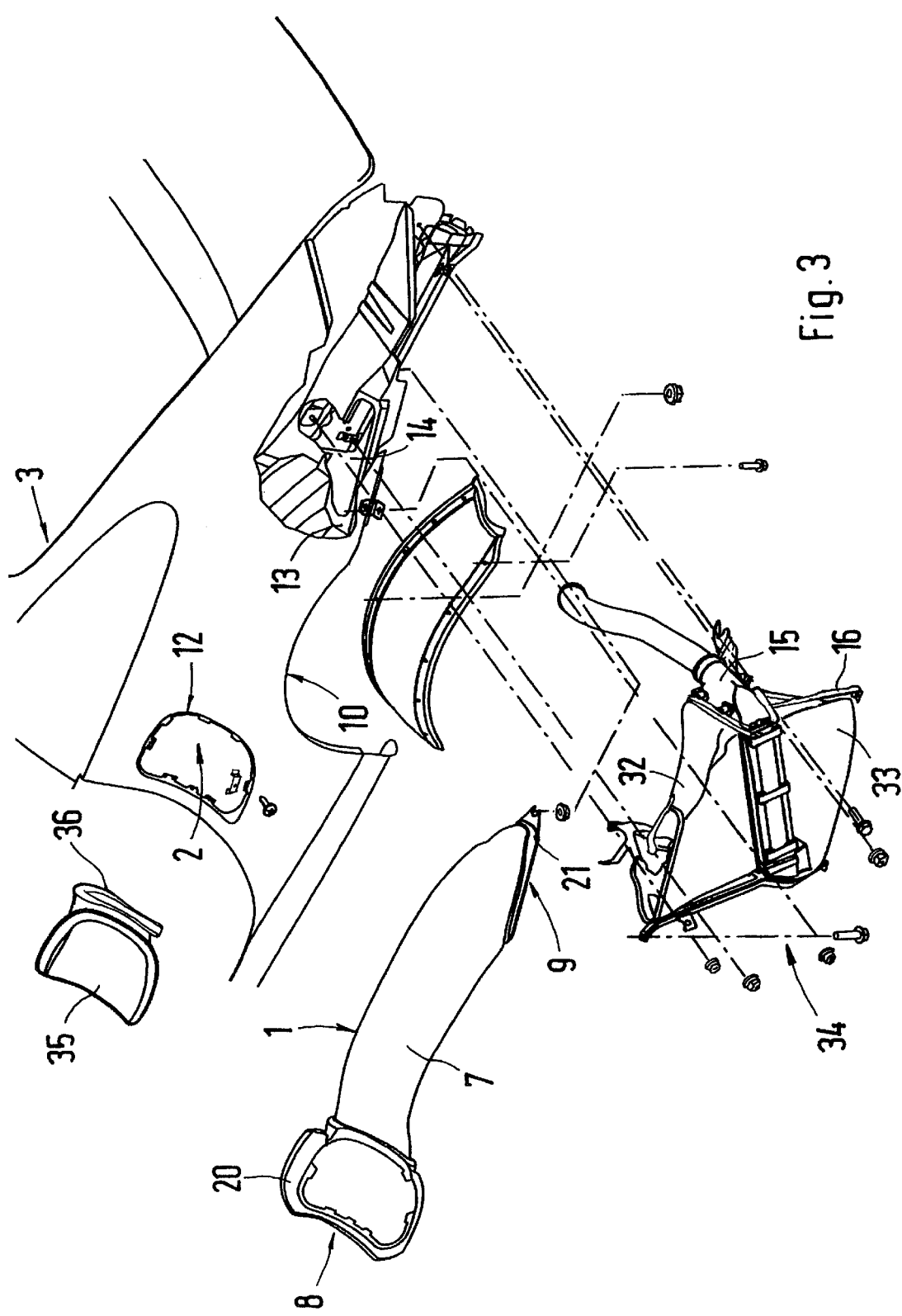
FIG. 3 is an exploded view of the components of a duct a well as of a cooler on the output side together with a holding frame.

In the illustrated embodiment, the duct 1 is used for feeding air to a cooler 15 arranged on the output side, in which case the cooler can be constructed as a charge air cooler or the like. The cooler 15, which is inclined in the space, is fastened by means of a holding frame 16 on upright vehicle body parts, specifically, viewed in the driving direction, behind the rearward wheel houses 10 (FIG. 3). Toward the outside, the cooler 15 is covered by lateral sections 17 of a bumper covering 18, which can be produced, for example, of an elastic material. In the lower edge area of the lateral sections 17 of the bumper covering 18, a lateral outlet opening 19 is provided for the cooling air flow which is guided through the cooler 15.

According to the invention, both ends 8, 9 of the guiding element 7 produced of plastic are provided with exterior surrounding flanges 20, 21, the flanges 20, 21 projecting beyond corresponding openings 12, 14 on the vehicle body parts 4, 6. Between the end-side flanges 20, 21 and the adjoining vehicle body parts 4, 6, one surrounding foam seal 22, 23 respectively is arranged which, during the painting process, swells up in the drying oven at a defined temperature and thus forms a tight connection between the guiding element 7 and the vehicle body parts 4, 6, so that the duct 1 is sealed off with respect to the adjoining air space 24 within the hollow space 2 of the vehicle body.

In the shown embodiment, the air space 24 of the hollow space 2 of the vehicle body is used for the air removal ventilation 25 of the vehicle interior. The air flow B of the air removal ventilation 25 extends opposite to the air flow A of the cooling air supply (see FIG. 1).

The duct 1 within the hollow space 2 of the vehicle body is formed as follows. First, the tube-shaped closed guiding element 7 made of plastic is produced by blowing or injection-molding, exterior flanges 20, 21 being formed at both ends 8, 9 of the guiding element 7, which flanges 20, 21 project at least in areas beyond the corresponding openings 12, 14 on the adjoining vehicle body parts 4, 6. Subsequently, respective surrounding foam seals 22, 23 are premounted on the two end-side flanges 20, 21, specifically on the side facing the adjoining vehicle body part 4, 6. Then the tube-shaped closed guiding element 7 is inserted into at least a first vehicle body part 4, 5 of the hollow space 2 of the vehicle body, specifically before the placing and connecting of the second vehicle body part 6. For the correct positioning of the guiding element 7 inside the hollow space 2 of the vehicle body, several bent-away holding lugs 26, 27 are constructed on the exterior side of the guiding element 7, which holding lugs 26, 27 can each be fixed by way of a screwed connection 28 to the first vehicle body part 4, 5 of the hollow space 2 of the vehicle body (FIGS. 5 and 6).

Figure 5:
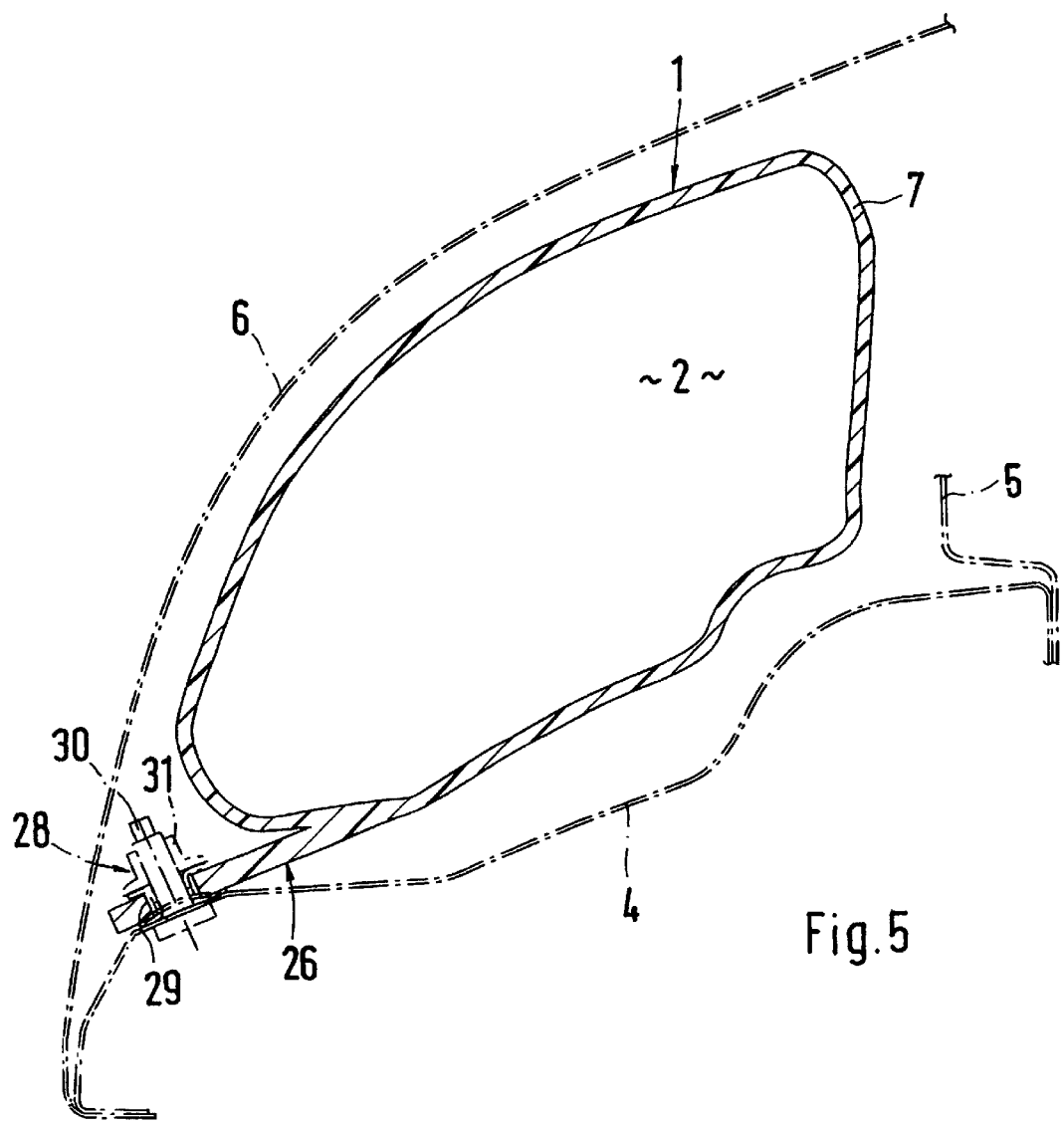
FIG. 5 is a sectional view along Line V—V of FIG. 2.
Figure 6:
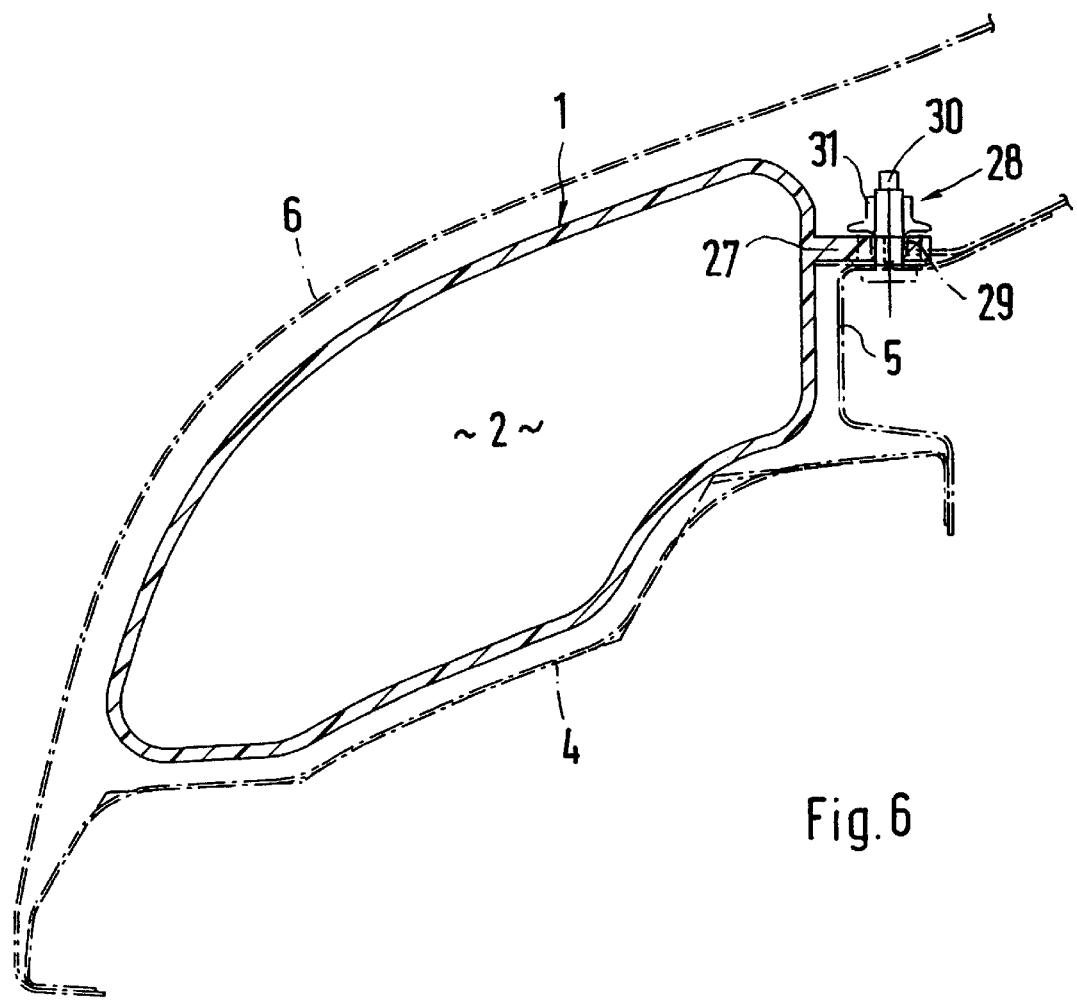
FIG. 6 is a sectional view along to Line VI—VI of Figure.
Figure 7:
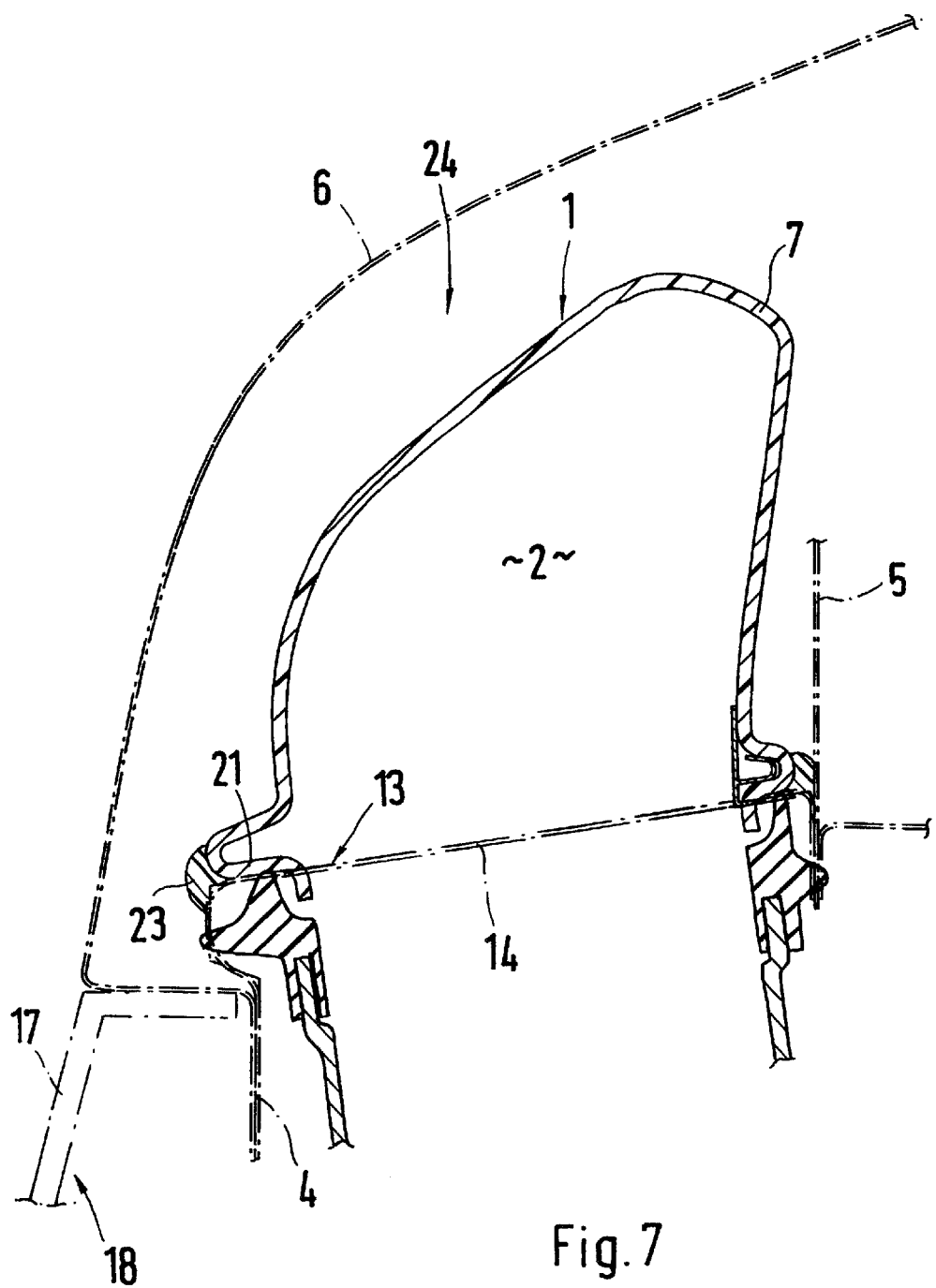
FIG. 7 is a sectional view along to Line VII—VII FIG. 2.

FIG. 5 illustrates the fastening of the guiding element 7 on the upper wheel house wall 4; whereas, in FIG. 6, the guiding element 7 is held in position on the opposite side on the interior side part 5. Both holding lugs 26, 27 have respective openings or slot-type openings 29, which reach around a stud 30 stationarily arranged on the vehicle body part 4, 5. One nut 31 respectively is screwed onto the stud 30, for fastening the guiding element 7.

After the inserting and connecting of the guiding element 7 in the hollow space 2 of the vehicle body, the second vehicle body part 6, in this case, the rearward side part is placed and is connected with the body shell by welding, screwing or the like. Then, the body shell and the interior guiding element 7 pass together through all painting processes, in which case, as the result of the temperature (approximately 185° C.) occurring in the KTL-dryer, the foam seals 22, 23 swell up which are premounted on the flanges 20, 21 of the guiding element 7, and thus the duct 1 is sealed off with respect to the surrounding air space 24 of the hollow space 2 of the vehicle body. In the illustrated embodiment the duct 1, is used for cooling air supply to cooler 15. Ducts formed in a similar manner as the duct 1 may also be used as a cable duct or for guiding a liquid medium (such as water), according to other contemplated embodiments of the invention.

Figure 4:
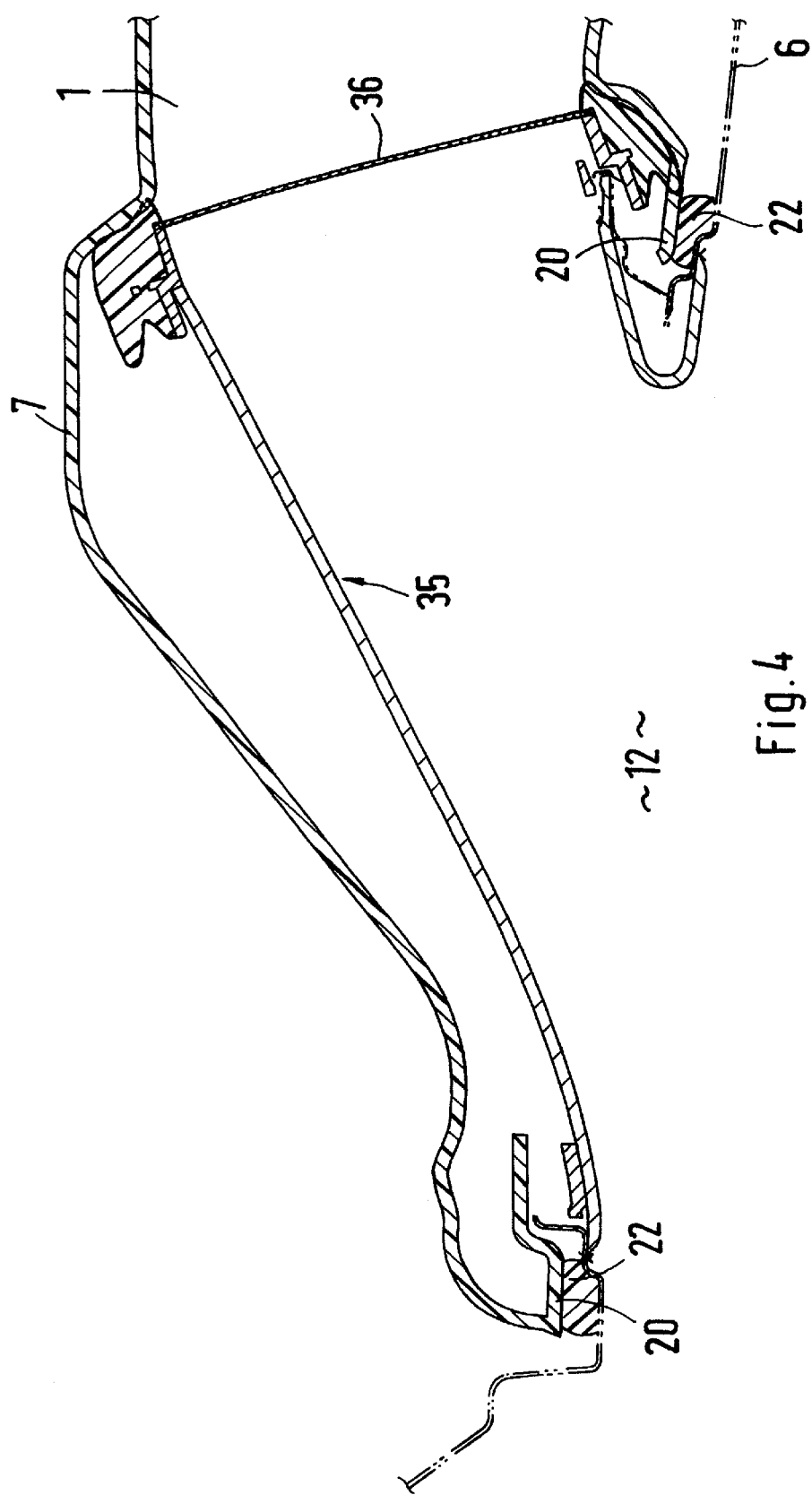
FIG. 4 is a sectional view along Line IV—IV of FIG. 2.

According to FIG. 4, the first end-side flange 20 of the guiding element 7 is connected, with the insertion of the foam seal 22, to the interior side of the upright rearward side part 6; whereas the second edge-side flange 21 of the guiding element 7 extends, with the insertion of the foam seal 23, to the top side of the wheel house wall 4. For optimizing the cooling air guiding, another air guiding element 32 extends from the opening 14 of the wheel house wall 4 to the cooler 15, and an air guiding scoop 33 is provided between the cooler 15 and the air outlet opening 19.

Together with the holding frame 16, the air guiding element 32 and the air guiding scoop 33, the cooler 15 forms a preassembled constructional unit 34 which can be fastened to the vehicle body by means of fastening screws.

From the direction of the exterior side of the vehicle, a collar 35 is inserted into the first opening 12 of the rearward side part 6, an air inlet grid 36 being provided on a rearward end area of the collar. If necessary, the tube-shaped guiding element 7 can additionally be fixed at both ends until the foam seals 22, 23 swell up.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for producing an elongated closed duct within a hollow space of a vehicle body, the hollow space of the vehicle body being composed of at least two vehicle body parts, and the duct being formed by a tube-shaped guiding element made of plastic, said process comprising:
providing both ends of the guiding element with exterior surrounding flanges, arranging respective surrounding foam seals between the flanges and the vehicle body parts, said foam seals being formed of material which swells up during heating in a predetermined temperature range and,
conducting a painting process including drying in a drying oven at the predetermined temperature range to thereby cause swelling of the foam seals to form a tight connection between the vehicle body parts and the closed duct guiding element.

2. Process according to claim 1,
wherein the tube-shaped closed duct guiding element is made of plastic by blowing or injection molding, end-side flanges of the guiding element projecting beyond assigned openings on the vehicle body parts,
wherein said arranging of the foam seals includes application of one surrounding foam seal respectively to the respective end-side flange of the closed duct guiding element on a side of the flange facing the adjoining vehicle body part,
wherein inserting and connecting of the tube-shaped closed duct guiding element on at least a first vehicle body part of the hollow space of the vehicle body is done before placing and connecting of the second vehicle body part, and
wherein said conducting of a painting process includes passing of the vehicle body, together with closed duct guiding element, through all painting processes, and as a result of the temperatures occurring in a dryer, the foam seals swelling up and the closed duct guiding element therefore being sealed off with respect to the surrounding air space of the hollow space of the vehicle body.

3. Process according to claim 2,
wherein the closed duct guiding element is arranged to feed air to a cooler disposed on an output side of the duct.

4. Process according to claim 2,
wherein the closed duct guiding element is a cable duct.

5. Process according to claim 2,
wherein the closed duct guiding element is arranged to guide a liquid medium.

6. Process according to claim 1,
wherein the closed duct guiding element is arranged to feed air to a cooler disposed on an output side of the duct.

7. Process according to claim 1,
wherein the closed duct guiding element is a cable duct.

8. Process according to claim 1,
wherein the closed duct guiding element is arranged to guide a liquid medium.

9. Process according to claim 1,
wherein the hollow space of the vehicle body is formed by a vehicle side member.

10. Process according to claim 1,
wherein the hollow space of the vehicle body extends above a wheel house of the vehicle body.

11. Process according to claim 1,
wherein several bent-away holding lugs are constructed on an exterior side of the guiding element, which holding lugs can each be fixed by way of at least one of a screwed connection and a snap-type connection to a first vehicle body part of the hollow apace of the vehicle body.

12. Process according to claim 1,
wherein the hollow space of the vehicle body is formed by an exterior rearward side part of a wheel house wall which bounds the wheel house in the upward direction and by an interior side part on an inside of the vehicle body, a first opening being provided on the rearward side part and a second opening being provided on the wheel house wall.

13. Process according to claim 1,
wherein the area within the hollow space of the vehicle body surrounding the duct is used for the air removal ventilation of the interior of the vehicle.

14. Process of making a vehicle body assembly which includes an elongated closed duct disposed in a vehicle hollow space bounded by at least two body parts, said process comprising:

mounting the closed duct in the vehicle hollow space with at least one surrounding foam seal disposed to seal the closed duct with respect to an adjacent vehicle body part, and conducting a painting process on the body assembly which includes heating to a predetermined temperature to effect swelling of the at least one surrounding foam seal to form a tight connection with the respective adjacent vehicle body part.

* * * * *